US008801250B2

(12) United States Patent
Uchida

(10) Patent No.: US 8,801,250 B2
(45) Date of Patent: Aug. 12, 2014

(54) VEHICLE LIGHTING DEVICE

(75) Inventor: Mitsuhiro Uchida, Kanagawa (JP)

(73) Assignee: Stanley Electric Co., Ltd., Tokyo (JP)

( * ) Notice: Subject to any disclaimer, the term of this patent is extended or adjusted under 35 U.S.C. 154(b) by 392 days.

(21) Appl. No.: 13/182,875

(22) Filed: Jul. 14, 2011

(65) Prior Publication Data

US 2012/0014125 A1 Jan. 19, 2012

(30) Foreign Application Priority Data

Jul. 14, 2010 (JP) ................................ 2010-159244

(51) Int. Cl.
*B60Q 1/04* (2006.01)

(52) U.S. Cl.
USPC ........... 362/538; 362/351; 362/507; 362/516; 362/539

(58) Field of Classification Search
USPC ......... 362/351, 352, 507, 516, 517, 518, 519, 362/520, 521, 522, 538, 539; 315/77, 82
See application file for complete search history.

(56) References Cited

U.S. PATENT DOCUMENTS

2003/0086277 A1* 5/2003 Hayakawa et al. ........... 362/513
2004/0022067 A1 2/2004 Taniuchi

FOREIGN PATENT DOCUMENTS

JP 2003-331617 A 11/2003

* cited by examiner

*Primary Examiner* — Mary McManmon
*Assistant Examiner* — Danielle Allen
(74) *Attorney, Agent, or Firm* — Kenealy Vaidya LLP

(57) ABSTRACT

A vehicle lighting device can include a bulb or a light source, a projector lens, a first reflection surface which reflects light toward the projector lens and collects the reflected light, a shade including an upper rim, the upper rim being movable between a light blocking position and a retracting position. The lighting device can also include a second reflection surface which reflects light downward when the shade is in the light blocking position, and a third reflection surface which reflects light forward to allow the reflected light to be emitted forward, when the shade is in the light blocking position. The device can also include a pair of left and right fourth reflection surfaces which reflect light in diagonally forward right and left directions, respectively, to allow the reflected light to be emitted in the diagonally forward right and left directions, when the shade is in the light blocking position.

10 Claims, 7 Drawing Sheets

VEHICLE LIGHTING DEVICE

This application claims the priority benefit under 35 U.S.C. §119 of Japanese Patent Application No. 2010-159244 filed on Jul. 14, 2010, which is hereby incorporated in its entirety by reference.

BACKGROUND

1. Field

The presently disclosed subject matter relates to a vehicle lighting device.

2. Description of Related Art

In a conventional projector-type vehicle lighting device, the upper rim of a shade is arranged near the focus of a projector lens, a bulb is arranged near the first focus of an ellipsoidal reflector, and the second focus of the ellipsoidal reflector is arranged near the focus of the projector lens (see, for example, Japanese Patent Application Laid-Open No. 2003-331617). The light emitted from the bulb is reflected in the front direction by the ellipsoidal reflector, and a part of this reflected light is blocked by the shade while the rest of the reflected light which is not blocked is emitted in the front direction through the projector lens. The light emitted through the projector lens does not illuminate above the horizontal plane passing through the optical axis of the lighting device, but illuminates below this horizontal plane. Thereby, a light distribution pattern for going by oncoming vehicles is formed, so that it is possible to prevent occurrence of glare with respect to oncoming vehicles.

The projector-type vehicle lighting device has a switching lighting device which enables switching between a high beam for driving and a low beam for going by oncoming vehicles, by falling or standing the shade. When the shade is standing, since the upper rim of the shade is positioned near the focus of the projector lens, a part of the light reflected by the ellipsoidal reflector is blocked by the shade. Therefore, a low beam for going by oncoming vehicles is formed. When the shade falls, since the upper rim of the shade is away from the focus of the projector lens and the second focus of the ellipsoidal reflector, the light reflected by the ellipsoidal reflector is not blocked by the shade. Thereby, a high beam for driving is formed.

Incidentally, in a conventional high beam/low beam switching lighting device, downward light which is not blocked in a low beam mode becomes downward light in a high beam mode. On the other hand, upward light which is blocked in the low beam mode stops being blocked in the high beam mode, and becomes upward light in the high beam mode. Hence, even when the high beam/low beam switching is performed, there is only a slight change in brightness of downward light and there is only a slight visual difference between the high beam and the low beam.

SUMMARY

Therefore, according to one aspect of the presently disclosed subject matter, an increase in the visual difference between a high beam and a low beam can be achieved.

According to another aspect of the presently disclosed subject matter, there is provided a vehicle lighting device including: a bulb or other light source; a projector lens provided in a front direction of the bulb, the projector lens having an optical axis in a front/back direction and having a focus between the projector lens and the bulb; a first reflection surface provided in a back direction of the projector lens, the first reflection surface reflecting light from the bulb toward the projector lens and collecting light, which is reflected by the first reflection surface, at or near the focus of the projector lens; a shade which includes an upper rim, the upper rim being movable between a light blocking position where the upper rim is at or near the focus of the projector lens, and a retracting position where the upper rim is away from the focus of the projector lens in a downward direction; a second reflection surface provided in a back surface of the shade, the second reflection surface reflecting a part of the light, which is reflected by the first reflection surface and is travelling toward the projector lens, in the downward direction, when the shade is in the light blocking position; a third reflection surface provided below the focus of the projector lens, the third reflection surface reflecting light, which is reflected by the second reflection surface, in the front direction to allow light which is reflected by the third reflection surface to be emitted in the front direction in such a way that the light which is reflected by the third reflection surface passes below the projector lens, when the shade is in the light blocking position; and a pair of left and right fourth reflection surfaces provided below the focus of the projector lens, the pair of fourth reflection surfaces reflecting the light, which is reflected by the second reflection surface, in a diagonally forward right direction and a diagonally forward left direction, respectively, to allow light which is reflected by the pair of fourth reflection surfaces to be emitted in the diagonally forward right direction and the diagonally forward left direction in such a way that the light which is reflected by the pair of fourth reflection surfaces passes below the projector lens, when the shade is in the light blocking position.

BRIEF DESCRIPTION OF THE DRAWINGS

The above and other objects, advantages and features of the presently disclosed subject matter will become more fully understood from the detailed description given hereinbelow and the appended drawings which are given by way of illustration only, and thus are not intended as a definition of the limits of the presently disclosed subject matter, and wherein.

DETAILED DESCRIPTION OF EXEMPLARY EMBODIMENTS

Figure 1:
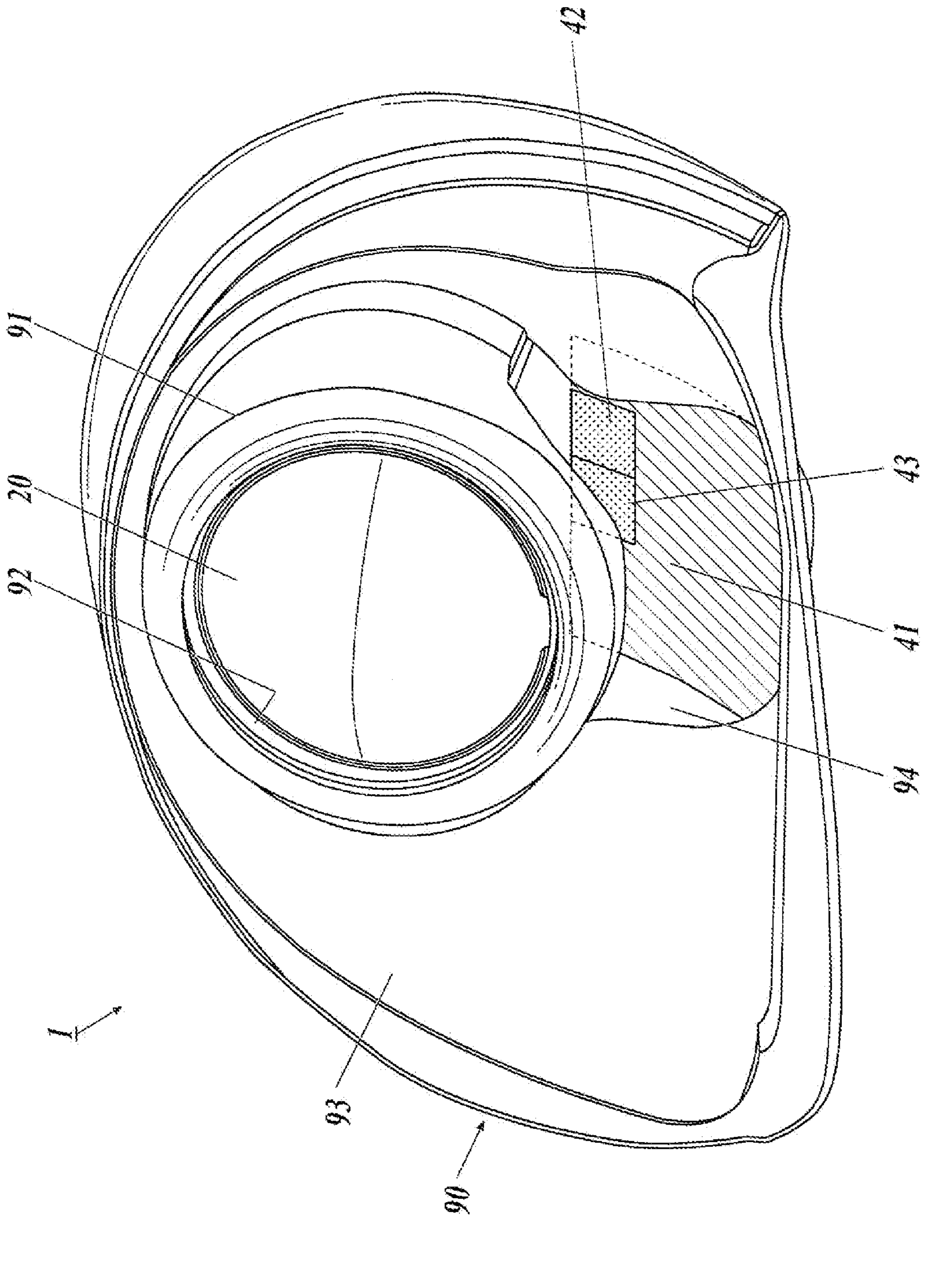
FIG. 1 is a front perspective view of a vehicle lighting device according to an embodiment of the presently disclosed subject matter.

Exemplary embodiments of the presently disclosed subject matter will be described below with reference to the accompanying drawings. Although various features for carrying out the presently disclosed subject matter are included in the embodiments described below, these features are not intended to limit the scope of the disclosed subject matter to the embodiments described below or to the examples shown in the drawings.

Further, in the following description, the directions of "up", "down", "front", "back", "left" and "right" respectively indicate "up", "down", "front", "back", "left" and "right" of a vehicle equipped with a vehicle lighting device. Hence, the directions of left and right are determined by assuming that the vehicle is seen from the back to the front (it is so-called driver's view or rider's view).

FIG. 1 is a perspective view illustrating a vehicle lighting device 1 viewed from a diagonal front.

This vehicle lighting device 1 can be used as a head lamp. This vehicle lighting device 1 has an extension 90. The extension 90 is fixed to a front end of a housing to cover a front opening of the housing (not illustrated). In the center of the extension 90, a lens frame 91 is provided, when seen from the front. The lens frame 91 is cylindrically-shaped and is provided so as to surround the periphery of the center line extending in the front/back direction. An opening 92 is formed at the front end of the lens frame 91. The opening 92 is through the lens frame 91 to the back side thereof. In the surrounding of the lens frame 91, an extension reflector 93 is provided. The extension reflector 93 is in a bowl shape which has an opening at the front side. The front opening of the extension reflector 93 is covered by a transparent cover. On the inner surface (front surface) of the extension reflector 93, a reflection film such as a vapor-deposited aluminum film is formed, thereby making the inner surface of the extension reflector 93 a reflection surface. In the part between the center of a lower part of the extension reflector 93 and a lower part of the peripheral surface of the lens frame 91, an opening part 94 is formed which is through the extension reflector 93 in the front/back direction. The opening part 94 is positioned below the opening 92 of the lens frame 91.

Figure 2:
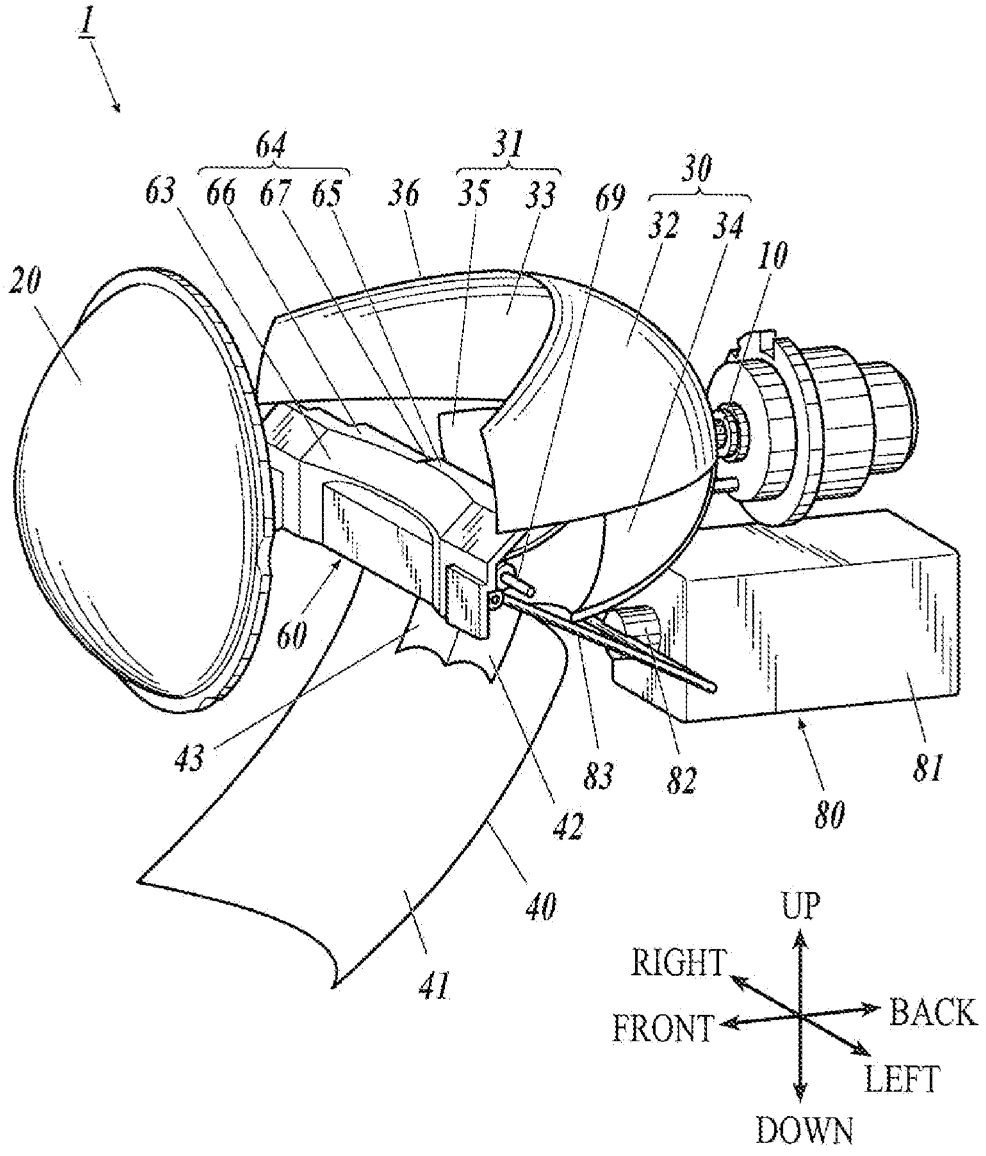
FIG. 2 is a perspective view of the vehicle lighting device of FIG. 1.
Figure 3:
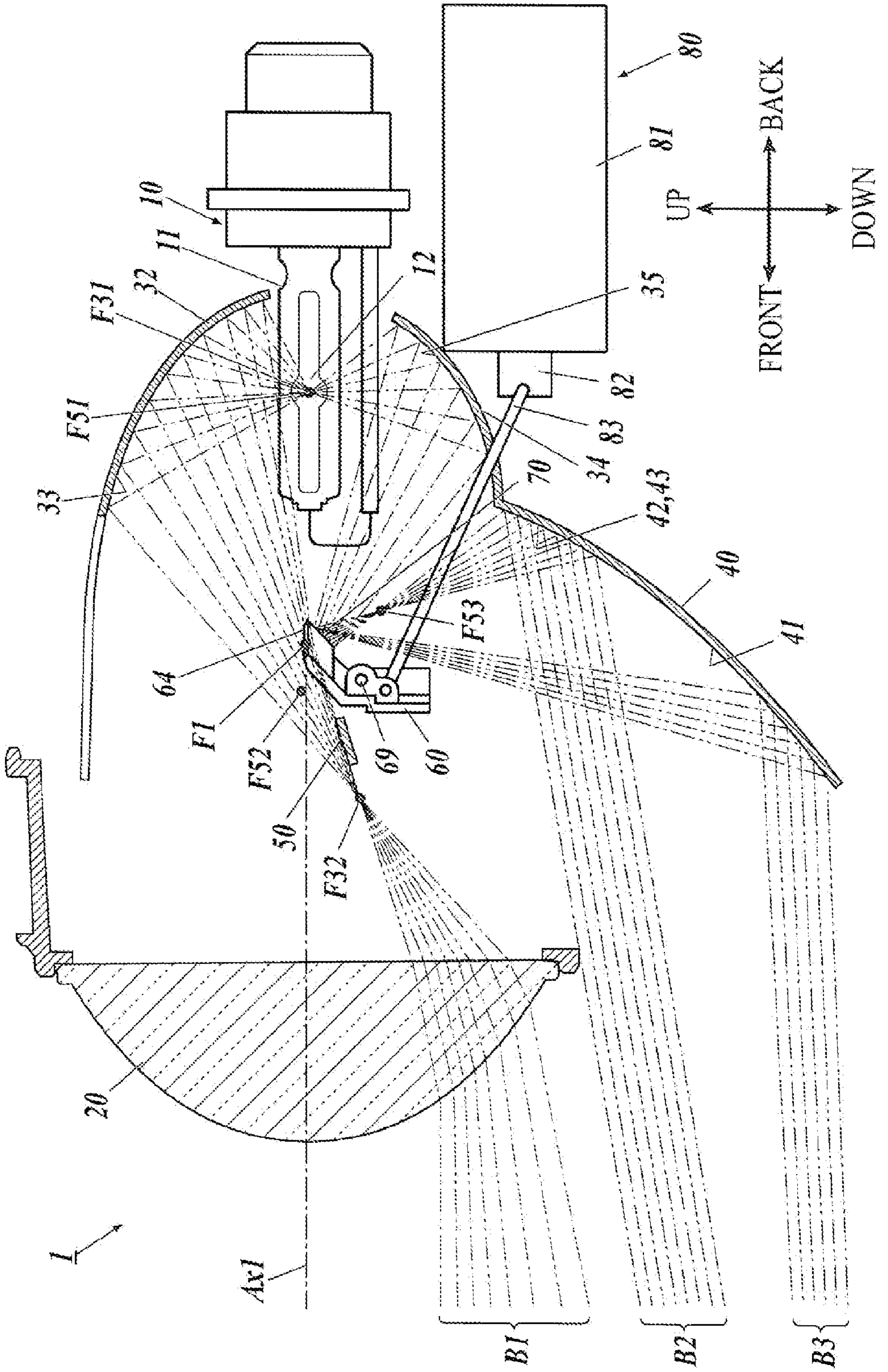
FIG. 3 is a sectional view of the vehicle lighting device of FIG. 1.
Figure 4:
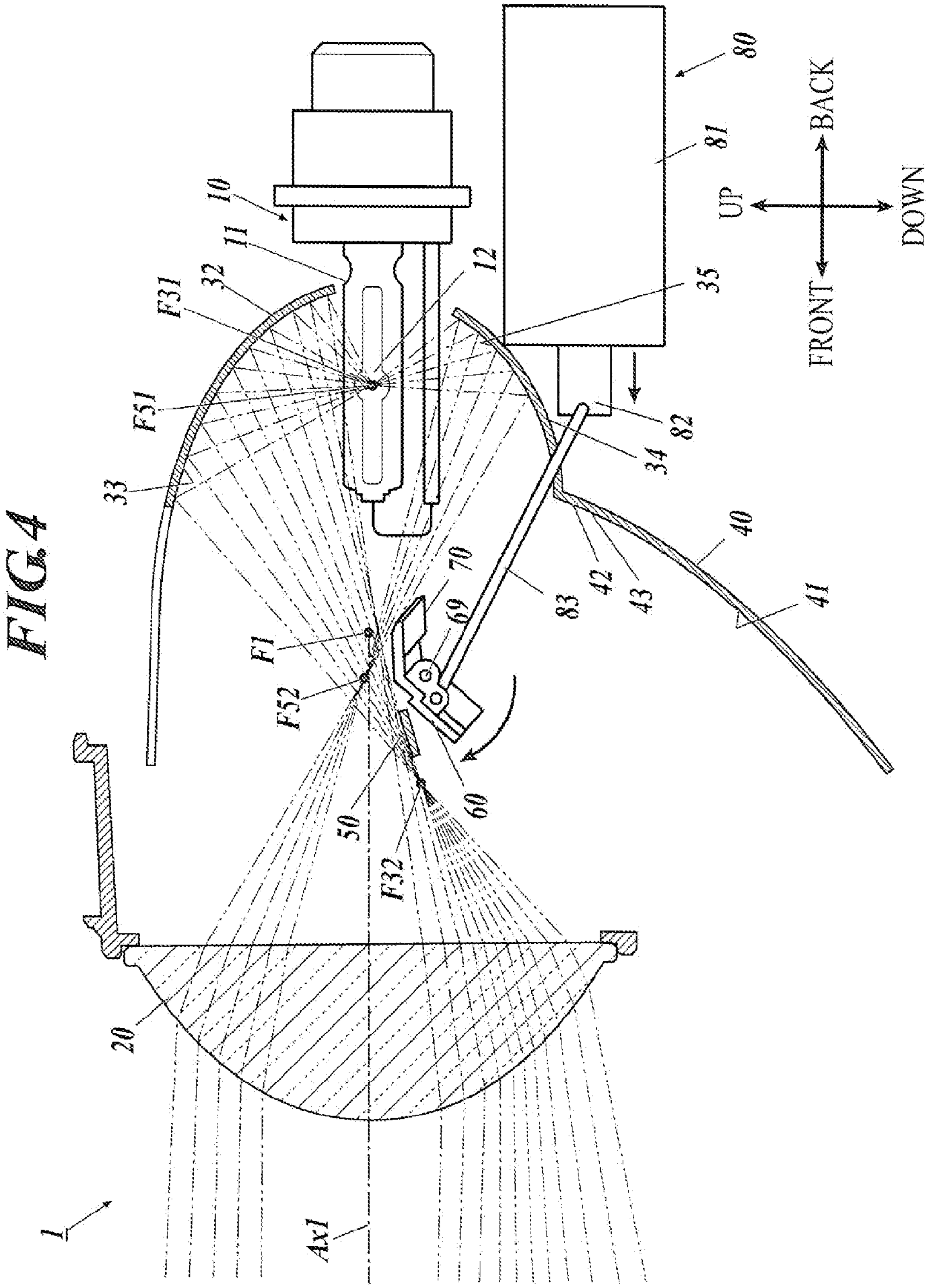
FIG. 4 is a sectional view of the vehicle lighting device of FIG. 1.

FIG. 2 is a perspective view illustrating the vehicle lighting device 1 viewed from the diagonal front. FIGS. 3 and 4 are sectional views along a vertical cross-sectional surface passing through the optical axis Ax1. FIGS. 2 to 4 illustrate the vehicle lighting device 1 without the extension 90 and the housing.

This vehicle lighting device 1 can have, for example, a bulb 10, a projector lens 20, an ellipsoidal reflector 30, a complex surface reflector 40, an overhead sign light distribution reflector 50, a shade 60, a reflection surface 70 and a driving mechanism 80. In FIG. 2, the overhead sign light distribution reflector 50 is not shown to illustrate the shade 60 in detail.

The bulb 10, the projector lens 20, the ellipsoidal reflector 30, the complex surface reflector 40, the overhead sign light distribution reflector 50, the shade 60 and the driving mechanism 80 can be integrally assembled, and unitized. This unit can be arranged at the back of the extension 90 and is contained in the housing. This unit can also be attached to the housing through an aiming mechanism. The aiming mechanism can incline the unit in the up/down or left/right direction relatively with respect to the housing, so that an attachment angle of the unit with respect to the housing can be adjusted.

The projector lens 20 can be a convex lens. As illustrated in FIG. 1, this projector lens 20 is arranged in the lens frame 91 so as to fill the opening 92. The projector lens 20 can be provided so that, when seen from the front, the extension 90 surrounds the upper, lower, left and right sides of the projector lens 20.

As illustrated in FIGS. 2 to 4, the optical axis Ax1 of this projector lens 20 extends in the front/back direction through the opening 92 (illustrated in FIG. 1), and the focus F1 of the projector lens 20 is set at the back of the projector lens 20. At the back of the projector lens 20, the bulb 10, the ellipsoidal reflector 30, the complex surface reflector 40, the overhead sign light distribution reflector 50 and the shade 60 can be arranged.

The bulb 10 can be an electric-discharge lamp (for example, a high-intensity discharge lamp (HID) or a high-pressure metallic vapor discharge lamp), a halogen bulb, a candescent light bulb or other bulbs. The bulb 10 can be arranged such that the longitudinal direction/axis of a glass tube 11 is aligned in the direction of the optical axis Ax1 (front/back direction). A light emitting section 12 of the bulb 10 can be arranged at the back of the focus F1 of the projector lens 20. The light emitting section 12 can be a luminous tube (discharging section) when the bulb 10 is an electric-discharge lamp, or can be a filament when the bulb 10 is a halogen bulb or a candescent light bulb. In addition, the bulb 10 may be arranged such that the longitudinal direction of the glass tube 11 of the bulb 10 crosses the optical axis Ax1. For example, the bulb 10 may be arranged transversely such that the longitudinal direction of the glass tube 11 is in the left/right direction.

The ellipsoidal reflector 30 can be provided in a nearly bowl shape, and have an opening toward the front. The inner surface of the ellipsoidal reflector 30 is referred to as a first reflection surface 31. The first reflection surface 31 reflects the light emitted from the light emitting section 12 of the bulb 10 toward the projector lens 20 in the front direction thereof, and collects light at or near the focus F1 of the projector lens 20.

The first reflection surface 31 can be formed in the shape of an ellipsoid. The ellipsoid means an ellipsoid of revolution whose axis of revolution is the center axis extending in the front/back direction, an oblate ellipsoid or a free-form surface based on these ellipsoids. The oblate ellipsoid refers to the ellipsoid of revolution whose axis of revolution is the center axis extending in the front/back direction and which is flattened in the up/down or left/right direction. Further, the first reflection surface 31 may be a complex ellipsoid combining any of the ellipsoid of revolution, oblate ellipsoid and free-form surface.

The ellipsoidal reflector 30 can be provided and configured as follows. That is, the ellipsoidal reflector 30 can include an upper reflector 32 and a lower reflector 34. The upper reflector 32 can be arranged above the bulb 10. Further, the upper reflector 32 can be provided in a nearly domed shape to cover the upper part of the light emitting section 12 of the bulb 10. More specifically, the upper reflector 32 can extend from the back of the light emitting section 12 to the diagonally upper front, diagonally upper forward right and diagonally upper forward left of the light emitting section 12. The lower reflector 34 can be arranged below the bulb 10. The lower reflector 34 can be provided in a nearly inverted domed shape to cover the lower part of the light emitting section 12. More specifically, the lower reflector 34 can extend from the back of the light emitting section 12 to the diagonally lower front, diagonally lower forward right and diagonally lower forward left of the light emitting section 12.

The inner surface of the upper reflector 32 can be referred to as an upper reflection surface 33, and the inner surface of the lower reflector 34 is referred to as a lower reflection surface 35. The combination of the upper reflection surface 33 and the lower reflection surface 35 is the first reflection surface 31. The upper reflection surface 33 can be an oblate ellipsoid formed by flattening, in the up/down direction, the ellipsoid of revolution whose axis of revolution is the center axis extending in the front/back direction and by expanding the ellipsoid of revolution in the left/right direction, or the upper reflection surface 33 is a free-form surface based on the oblate ellipsoid. The lower reflection surface 35 can be an ellipsoid of revolution whose axis of revolution is the center axis extending in the front/back direction, or a free-form surface based on this ellipsoid of revolution. The degree of flattening of the upper reflection surface 33 in the up/down direction can be larger than the degree of flattening of the lower reflection surface 35 in the up/down direction, and the upper reflection surface 33 can be provided to extend wider in the left/right direction compared to the lower reflection surface 35.

The back focus (first focus) F31 of the upper reflection surface 33 can be set inside the upper reflector 32, and the front focus (second focus) F32 of the upper reflection surface 33 can be set in the front direction of the back focus F31. The back focus (first focus) F51 of the lower reflection surface 35 can be set inside the lower reflector 34, and the front focus (second focus) F52 of the lower reflection surface 35 is set in the front direction of the back focus F51. Since the upper reflection surface 33 can be formed as an oblate ellipsoid or free-form surface based on the oblate ellipsoid, the front focus F32 can be a curved focal line extending in horizontal left/right direction, and forming a convexity backward. The front focus F52 of the lower reflection surface 35 may be a curved focal line extending in the horizontal left/right direction, and forming a convexity backward.

The back focuses F31 and F51 of the upper reflection surface 33 and the lower reflection surface 35 can be positioned at or near the light emitting section 12 of the bulb 10. The back focus F31 of the upper reflection surface 33 and the back focus F51 of the lower reflection surface 35 can overlap and, the back focuses F31 and F51 can overlap the light emitting section 12.

The front focuses F32 and F52 of the upper reflection surface 33 and the lower reflection surface 35 can be positioned at or near the focus F1 of the projector lens 20. The front focus F32 of the upper reflection surface 33 can be positioned in the front direction of the focus F1 of the projector lens 20 and in the back direction of the projector lens 20, and the front focus F52 of the lower reflection surface 35 can be positioned closer to the focus F1 of the projector lens 20 than the focus lens F32 of the upper reflection surface 33. In addition, the front focus F52 of the lower reflection surface 35 can be positioned in the front direction of the focus F1 of the projector lens 20 and in the back direction of the projector lens 20.

As described above, since the first reflection surface 31 can be a complex ellipsoid of the upper reflection surface 33 and the lower reflection surface 35, the front focus of the first reflection surface 31 appears as the front focuses F32 and F52. The upper reflection surface 33 reflects the light emitted from the light emitting section 12, toward the projector lens 20 in the front direction thereof, and collects this reflected light on the front focus F32. The lower reflection surface 35 reflects the light emitted from the light emitting section 12, toward the projector lens 20 in the front direction thereof, and collects this reflected light on the front focus F52. In addition, when the first reflection surface 31 is not a complex ellipsoid of the upper reflection surface 33 and the lower reflection surface 35 but is a single ellipsoid, the back focus of the first reflection surface 31 can be positioned at or near the light emitting section 12 of the bulb 10, and the front focus of the first reflection surface 31 is positioned at or near the focus F1 of the projector lens 20.

The shade 60 can be arranged between the bulb 10 and the projector lens 20. The shade 60 blocks a part of the light which is reflected by the first reflection surface 31 and travels toward the projector lens 20, at or near the focus F1 of the projector lens 20 to form a light distribution pattern having a light/dark boundary.

Figure 5:
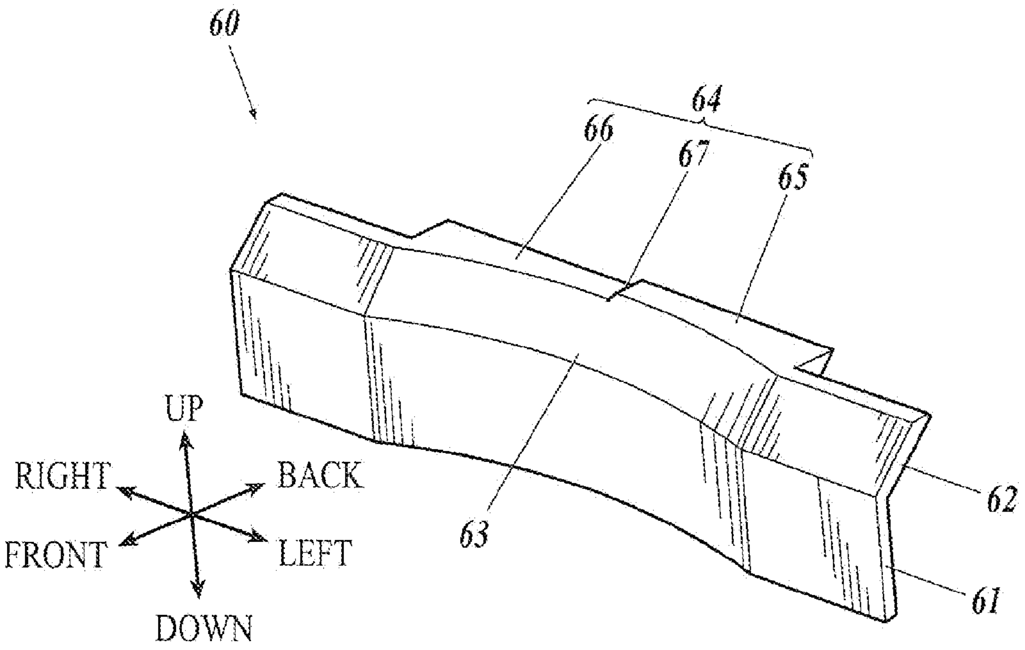
FIG. 5 is a front perspective view of a shade for the vehicle lighting device of FIG. 1.
Figure 6:
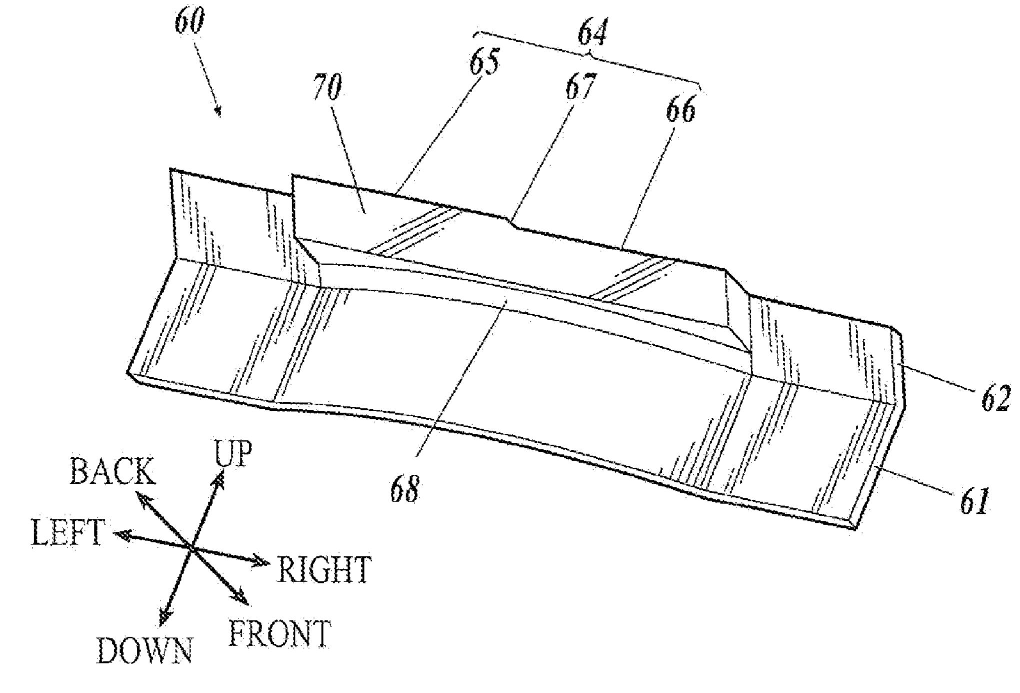
FIG. 6 is a back perspective view of the shade of the vehicle lighting device of FIG. 1.

FIG. 5 is a schematic perspective view illustrating the shade 60 which is standing viewed from the diagonal front, and FIG. 6 is a schematic view illustrating the shade 60 which is standing from the diagonal back. In FIGS. 5 and 6, the directions of up, down, front, back, left and right indicated by arrows indicate directions with respect to the shade 60 when the shade 60 is standing.

As illustrated in FIGS. 2 to 6, the shade 60 has a lower part 61 and an upper part 62, which are formed in a plate shape. The upper part 62 of the shade 60 can be inclined upward and backward from the upper end of the lower part 61. The center in the left/right direction of the front surface 63 of the lower part 61 and the upper part 62 of the shade 60 can be curved making a dent backward corresponding to the curve of the imaging plane of the projector lens 20.

A part 65 (hereinafter referred to as a left upper rim 65) to the left of the optical axis Ax1 in the upper rim 64 of the upper part 62 of the shade 60 can be provided and can be nearly or totally flat (i.e., substantially flat). The part 66 (hereinafter referred to as a right upper rim 66) to the right of the optical axis Ax1 can also be nearly or totally flat. The left upper rim 65 and the right upper rim 66 are provided parallel to each other. There is a difference in height between the left upper rim 65 and the right upper rim 66, and a part 67 (hereinafter referred to as a inclining part 67) between the left upper rim 65 and the right upper rim 66 is inclined with respect to the left upper rim 65 and the right upper rim 66. The inclined angle of the inclining part 67 can be 15 degrees or 45 degrees with respect to the left upper rim 65 and the right upper rim 66. Alternatively, the left upper rim 65 and right upper rim 66 may be aligned without the inclining part 67.

The shade 60 can be arranged between the projector lens 20 and the bulb 10. This shade 60 can be movable between a light blocking position (see FIG. 3) where a part of the light reflected in the front direction by the first reflection surface 31 is blocked, and a retracting position (see FIG. 4) which is away from the light blocking position in the down direction. More specifically, the shade 60 is movably provided as follows. That is, a rotation shaft 69 extending in the left/right direction can be attached to the back face of the lower part 61 of the shade 60, the rotation shaft 69 is rotatably supported on a fixing member, such as a housing, and the shade 60 is rotatably provided around the rotation shaft 69. The shade 60 stands up or falls down backward about the rotation shaft 69.

When the shade 60 is standing, the shade 60 is in the light blocking position, and the upper rim 64 of the shade 60 is positioned at or near the focus F1 of the projector lens 20. When the shade 60 is in the light blocking position, the left upper rim 65 and the right upper rim 66 are horizontal. Further, when the shade 60 is in the light blocking position, one side of the optical axis Ax1 on the upper rim 64 of the shade 60 is set higher than the other side, wherein the former is the side of the traffic lane of the vehicle and the other is the side of the opposite traffic lane. More specifically, when the vehicle lighting device 1 is for left-hand traffic, the left upper rim 65 is positioned above the right upper rim 66 and the inclining part 67 is inclined downward to the right. FIGS. 2, 5 and 6 illustrate the shade 60 for left-hand traffic. On the other hand, when the vehicle lighting device 1 is for right-hand traffic, the right upper rim 66 of the shade 60 is positioned above the left upper rim 65, and the inclining part 67 is inclined downward to the left.

On the other hand, when the shade 60 falls backward about the rotation shaft 69, the shade 60 is in the retracting position, and the upper rim 64 of the shade 60 is away from the focus F1 of the projector lens 20 diagonally downward to the back.

The shade 60 can be driven by the driving mechanism 80. The driving mechanism 80 drives the shade 60 from the light blocking position to the retracting position or from the retracting position to the light blocking position. The driving mechanism 80 can include a solenoid 81 and an arm 83. The solenoid 81 can be attached to a fixing member such as a housing, and can be arranged below the lower reflector 34. The solenoid 81 can be arranged such that a plunger 82 faces in the front direction. The solenoid 81 allows the plunger 82 to be pushed forward and pulled back. The front end of the plunger 82 can be rotatably connected to one end of the arm 83. The other end of the arm 83 can be rotatably connected to the shade 60.

In the upper part and the center in the left/right direction of the rear face 68 of the shade 60, a second reflection surface 70 can be formed. When the shade 60 is in the light blocking position, this second reflection surface 70 is directed diagonally downward to the back. The second reflection surface 70 can be provided in a belt shape which is long in the left/right direction along the upper rim 64 of the shade 60. The second reflection surface 70 may be a plane surface, curved surface (for example, a convex surface, a concave surface, a cylindrical surface or a spherical surface) or a free-form surface (an aspheric surface) based on the plane surface or the curved surface.

When the shade 60 is in the light blocking position, the second reflection surface 70 is positioned in the back direction of the front focus F52 of the lower reflection surface 35, and is positioned between the front focus F52 and the lower reflection surface 35. When the shade 60 is in the light blocking position, the second reflection surface 70 reflects a part of the light, which is reflected by the first reflection surface 31 to travel toward the projector lens 20, in the down direction. More specifically, the second reflection surface 70 reflects most of the light, which is reflected by the lower reflection surface 35, diagonally downward to the back, and changes the front focus F52 of the lower reflection surface 35 to the focus F53 at the diagonally lower back position of the second reflection surface 70. That is, the focus F53 of an optical system having the lower reflection surface 35 and the second reflection surface 70 is set in the back direction of the second reflection surface 70 and below the optical axis Ax1, and a part of the light reflected by the first reflection surface 31 is collected on the focus F53.

Figure 7:
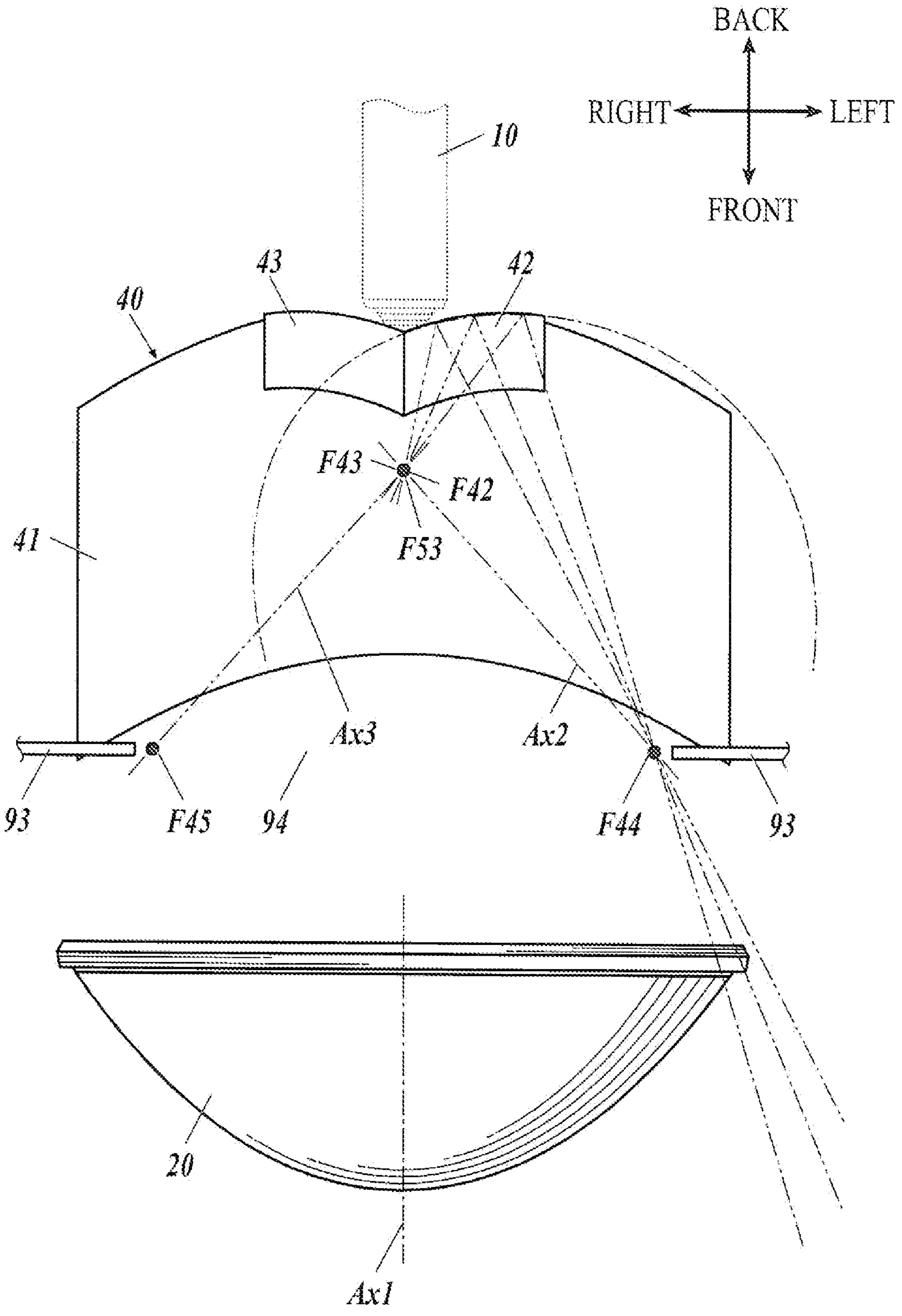
FIG. 7 is a top view illustrating the relationship between the positions of each member of the vehicle lighting device of FIG. 1.

The light reflected by the second reflection surface 70 is reflected by the complex surface reflector 40 in the front direction. As illustrated in FIGS. 2 and 3, the complex surface reflector 40 can be arranged below the shade 60 and the second reflection surface 70. FIG. 7 is a top view illustrating the positions of the projector lens 20, the complex surface reflector 40, extension reflector 93 and the bulb 10. As illustrated in FIGS. 7 and 1, the complex surface reflector 40 can be arranged in the back direction of the extension reflector 93 to face the opening part 94 of the extension 90.

As illustrated in FIGS. 2 and 3, the complex surface reflector 40 and ellipsoidal reflector 30 can be integrated. More specifically, the complex surface reflector 40 can hang down diagonally downward to the front from the front end of the lower reflector 34, and the upper end of the complex surface reflector 40 and the front end of the lower reflector 34 can be connected to each other.

In the center in the left/right direction of the upper area on the front inner surface of the complex surface reflector 40, a pair of left and right fourth reflection surfaces 42 and 43 can be formed. In the areas to the left and right of the fourth reflection surfaces 42 and 43 and a peripheral area below the left and right areas on the front inner surface of the complex surface reflector 40, the third reflection surface 41 can be formed. The third reflection surface 41 and the fourth reflection surfaces 42 and 43 can be arranged in the back direction of the projector lens 20. Further, the third reflection surface 41 and the fourth reflection surfaces 42 and 43 can be arranged below the focus F1 of the projector lens 20.

The third reflection surface 41 can be formed in a paraboloid shape. The paraboloid means a paraboloid of revolution whose axis of revolution is the center axis extending in the front/back direction, or a free-form surface based on the paraboloid of revolution. The focus of the third reflection surface 41 can be set at or near the focus F1 of the projector lens 20. The focus of the third reflection surface 41 can be set slightly in the back direction of the focus F1 of the projector lens 20 and at the same time below the focus F1. The focus of the third reflection surface 41 can overlap the focus F53 of the optical system having the lower reflection surface 35 and the second reflection surface 70.

The third reflection surface 41 reflects the light, which is reflected downward by the second reflection surface 70, in the front direction. The light reflected by the third reflection surface 41 is emitted in the front direction through the opening part 94 below the projector lens 20.

As illustrated in FIG. 7, the shape of the fourth reflection surface 42 in the horizontal cross-sectional surface can be an elliptic arc or a free curve based on the elliptic arc. In a planar view from the above, a back focus (a first back focus) F42 related to the elliptic arc of the fourth reflection surface 42 is set at or near the focus F53 of the optical system having the lower reflection surface 35 and the second reflection surface 70. In a planar view from the above, a long axis Ax2 related to the elliptic arc of the fourth reflection surface 42 extends to the diagonally forward left from the back focus F42, and is inclined leftward based on the optical axis Ax1. In a planar view from the above, a front focus (a first front focus) F44 related to the elliptic arc of the fourth reflection surface 42 can be set in the diagonally forward left of the focus F53 of the optical system having the lower reflection surface 35 and second reflection surface 70. More specifically, the front focus F44 can be set near the left rim of the opening part 94 in the opening part 94.

The shape of the fourth reflection surface 42 in the vertical cross section vertical to the left/right direction can be a straight line, an arc, an elliptic arc, a parabola or a free curve based on these. The shape of the fourth reflection surface 42 in the vertical cross section vertical to the left/right direction may have other shapes.

The shape of the fourth reflection surface 43 on the horizontal cross-sectional surface can be an elliptic arc or free curve based on the elliptic arc. In a planar view from the above, a back focus F43 (a second back focus) related to the elliptic arc of the fourth reflection surface 43 is set at or near the focus F53 of the optical system having the lower reflection surface 35 and the second reflection surface 70. In a planar view from the above, a long axis Ax3 related to the elliptic arc of the fourth reflection surface 43 extends to the diagonally forward right from the back focus F43, and is inclined rightward based on the optical axis Ax1. In a planar view from the above, a front focus (a second front focus) F45 related to the elliptic arc of the fourth reflection surface 43 is set to the diagonally forward right of the focus F53 of the optical system having the lower reflection surface 35 and the second reflection surface 70. More specifically, the front focus F45 is set near the right rim of the opening part 94 in the opening part 94.

The shape of the fourth reflection surface 43 in the vertical cross section vertical to the left/right direction can be a straight line, an arc, an elliptic arc, a parabola or a free curve based on these. The shape of the fourth reflection surface 43 in the vertical cross section vertical to the left/right direction may have other shapes.

The fourth reflection surface 42 can be arranged to the left of the vertical cross-sectional surface passing through the optical axis Ax1, and the fourth reflection surface 43 can be arranged to the right of the vertical cross-sectional surface passing through the optical axis Ax1. The vertical cross-sectional surface passing through the optical axis Ax1 passes the right rim of the fourth reflection surface 42 and the left rim of the fourth reflection surface 43. The left and right fourth reflection surfaces 42 and 43 can be symmetrical with respect to the plane of the vertical cross-sectional surface passing through the optical axis Ax1. In addition, the left and right fourth reflection surfaces 42 and 43 may not be symmetrical with respect to the plane.

The overhead sign light reflector 50 can be arranged in the front direction of the shade 60. The overhead sign light distribution reflector 50 reflects a part of reflected light which is not blocked by the shade 60, upward toward the projector lens 20, and forms overhead sign distribution light.

Next, an exemplary operation of the shade 60 will be described.

When the plunger 82 of the solenoid 81 is pulled back, the shade 60 stands forward about the rotation shaft 69. Further, as illustrated in FIG. 3, when the shade 60 moves to the light blocking position, the pulling-back operation of the plunger 82 of the solenoid 81 also stops.

On the other hand, when the plunger 82 of the solenoid 81 is pushed forward, the shade 60 falls backward about the rotation shaft 69. Further, as illustrated in FIG. 4, when the shade 60 moves to the retracting position, the pushing-forward operation of the plunger 82 of the solenoid 81 also stops.

Figure 8:
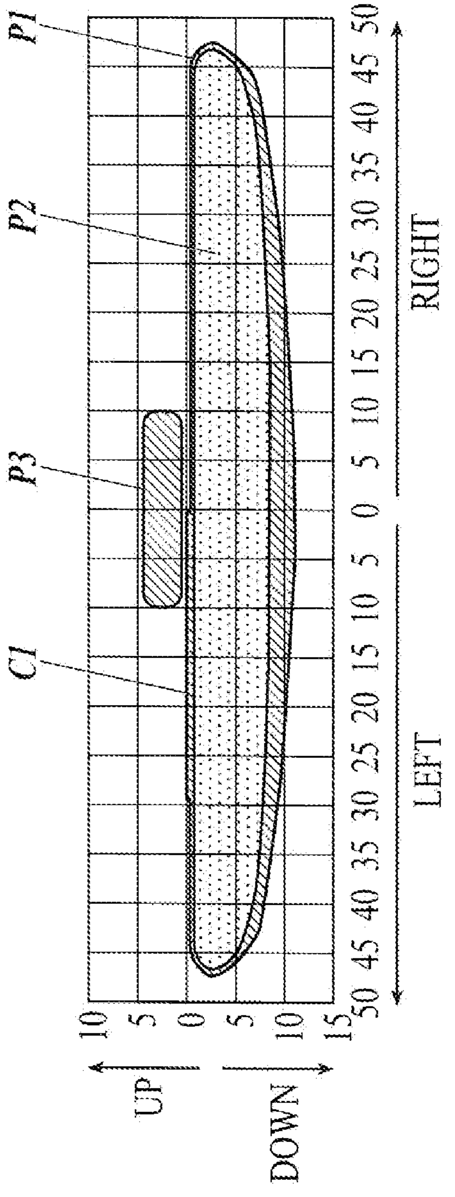
FIG. 8 is a view illustrating a light distribution pattern of a beam for passing by oncoming vehicles formed on a virtual screen by the vehicle lighting device of FIG. 1.
Figure 9:
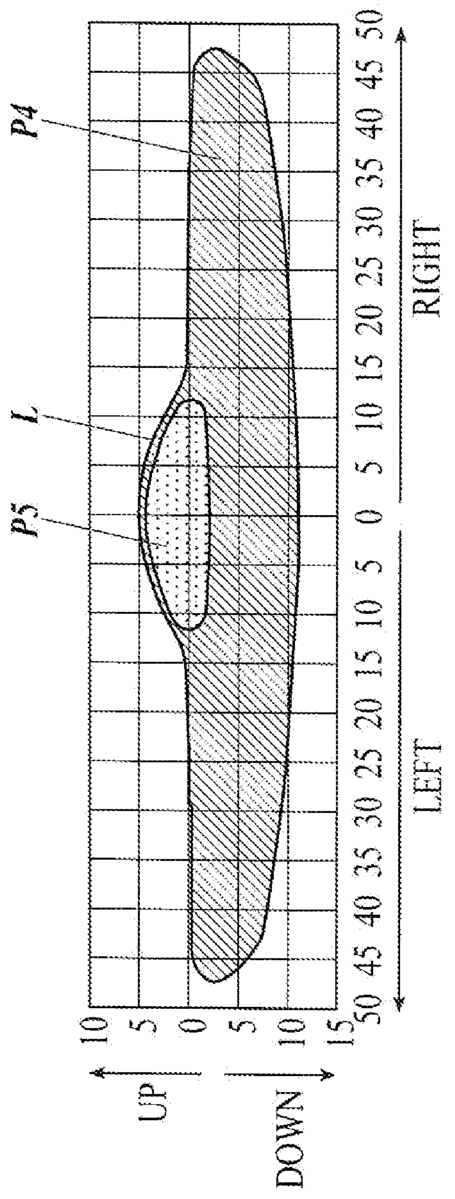
FIG. 9 is a view illustrating a light distribution pattern of a beam for driving formed on the virtual screen by the vehicle lighting device of FIG. 1.

With reference to FIGS. 8 and 9, exemplary light distribution characteristics of the vehicle lighting device 1 will be described. FIG. 8 illustrates a light distribution pattern when the shade 60 is in the light blocking position. FIG. 9 illustrates a light distribution pattern when the shade 60 is in the retracting position. FIGS. 8 and 9 illustrate light distribution patterns formed on a virtual screen at a predetermined distance from the vehicle lighting device 1 in the front direction. In FIGS. 8 and 9, the horizontal axis represents the angles in the left/right direction, with the intersection of the optical axis Ax1 and the virtual screen set as zero degree. The vertical axis represents the angles in the up/down direction, with the intersection of the optical axis Ax1 and the virtual screen set as zero degree.

Next, a case where the shade 60 is in the light blocking position will be described (see FIG. 3 and FIG. 8).

Power is fed to the bulb 10 and the light emitting section 12 emits light. Then, the light emitted from the light emitting section 12 is reflected in the front direction by the first reflection surface 31. When the shade 60 is in the light blocking position, a part of the light reflected by the first reflection surface 31 is blocked by the shade 60. The reflected light which has passed above the shade 60 without being blocked by the shade 60 enters the projector lens 20, and is emitted in the front direction of the projector lens 20. Since a part of the reflected light is blocked by the shade 60, the area illuminated with the light which is emitted in the front direction through the projector lens 20 is below the horizontal plane passing through the optical axis Ax1. Therefore, a light distribution pattern P1 illustrated in FIG. 8 is formed on the virtual screen. The light distribution pattern P1 has, in the upper rim of a bright part, a cutoff line (light/dark boundary) C1 along the intersection of the horizontal plane passing through the optical axis Ax1 and the virtual screen (the line of the zero degree in the up/down direction about the optical axis Ax1). The light which contributes to formation of the bright part of the light distribution pattern P1 is mainly the light which is emitted upward from the light emitting section 12 and then reflected by the upper reflection surface 33 (see an optical beam B1 illustrated in FIG. 3). Since the upper reflection surface 33 is provided to be wide in the left/right direction, the bright part of this light distribution pattern P1 extends wide in the left/right direction. In addition, when the bulb 10 is an HID, the light emitted upward by the light emitting section 12 is white light, and therefore the bright part of the light distribution pattern P1 is white.

Reflected light which has passed above the shade 60 without being blocked by the shade 60 is reflected by the overhead sign light distribution reflector 50, and this reflected light is emitted above the horizontal plane passing through the optical axis Ax1 through the projector lens 20. Consequently, an overhead sign distribution light pattern P3 is formed on the virtual screen as illustrated in FIG. 8.

Further, a part of the light reflected by the first reflection surface 31 is reflected by the second reflection surface 70 toward the third reflection surface 41 and the fourth reflection surfaces 42 and 43 below. The light reflected by the second reflection surface 70 is reflected by the third reflection surface 41 and the fourth reflection surfaces 42 and 43. The light reflected by the third reflection surface 41 and the fourth reflection surfaces 42 and 43 is emitted in the front direction passing the opening part 94. The area illuminated with the light which is reflected in the front direction by the third reflection surface 41 and the fourth reflection surfaces 42 and 43 is below the horizontal plane passing through the optical axis Ax1, so that a light distribution pattern P2 is formed on the virtual screen as illustrated in FIG. 8. The bright part of the light distribution pattern P2 overlaps the bright part of the light distribution pattern P1. The combination of the light distribution pattern P1 and the light distribution pattern P2 provide a light distribution pattern of a low beam for going by oncoming vehicles.

The light which contributes to formation of the bright part of the light distribution pattern P2 is mainly the light which is emitted downward from the light emitting section 12, and then is reflected by the lower reflection surface 35 (see an optical beam B2 illustrated in FIG. 3). Further, a part of the light reflected by the upper reflection surface 33 is also reflected downward by the second reflection surface 70, and this light also contributes to formation of the bright part of the light distribution pattern P2 (see an optical beam B3 illustrated in FIG. 3). Since most of the light reflected by the upper reflection surface 33 passes above the shade 60, the light reflected by the lower reflection surface 35 contributes to formation of the bright part of the light distribution pattern P2 more than the light reflected by the upper reflection surface 33. In addition, when the bulb 10 is an HID, the light emitted downward by the light emitting section 12 is yellow light, and therefore the bright part of the light distribution pattern P2 is yellow.

The light which is incident on the third reflection surface 41 among light (the optical beam B2) which is reflected by the lower reflection surface 35 and the second reflection surface 70 is reflected in the front direction by the third reflection surface 41. The light reflected by the third reflection surface 41 becomes nearly parallel light, and the area illuminated with the parallel light is below the horizontal plane passing through the optical axis Ax1, wherein the center of the illuminated area is the position of the zero degree in the left/right direction.

The light which is incident on the fourth reflection surface 42 among the light reflected by the lower reflection surface 35 and the second reflection surface 70 is reflected diagonally forward to the left by the fourth reflection surface 42. The light reflected by the fourth reflection surface 42 is collected near the left rim of the opening part 94 in the opening part 94. The light extends wider in the position in the front direction of the position of the collected light. The area illuminated with the light which is reflected by the fourth reflection surface 42 is below the horizontal plane passing through the optical axis Ax1, wherein the center of the illuminated area is in the left side (intersection of the long axis Ax2 and the virtual screen) of the position of the zero degree in the left/right direction.

The light which is incident on the fourth reflection surface 43 among the light reflected by the lower reflection surface 35 and the second reflection surface 70 is reflected diagonally forward to the right by the fourth reflection surface 43. The light reflected by the fourth reflection surface 43 is collected near the right rim of the opening part 94 in the opening part 94. The light extends wider in the position in the front direction of the position of the collected light. The area illuminated with the light which is reflected by the fourth reflection surface 43 is below the horizontal plane passing through the optical axis Ax1, wherein the center of the illuminated area is in the right side (intersection of the long axis Ax3 and the virtual screen) of the position of the zero degree in the left/right direction.

The bright part of the light distribution pattern P2 is a combination of the areas illuminated with the light which is reflected by the third reflection surface 41 and the fourth reflection surfaces 42 and 43. Hence, the bright part of this light distribution pattern P2 extends wide in the left/right direction.

A case where the shade 60 is in the retracting position will be described (see FIGS. 4 and 9).

When the shade 60 is in the retracting position, the light reflected by the first reflection surface 31 is not blocked, and no reflected light is incident on the second reflection surface 70. The light reflected by the first reflection surface 31 enters the projector lens 20, and is emitted in the front direction of the projector lens 20. Therefore, the light distribution pattern is formed on the virtual screen as illustrated in FIG. 9. The light distribution pattern illustrated in FIG. 9 is a light distribution pattern for a high beam for driving, and is a combination of the light distribution pattern P4 and the light distribution pattern P5.

The light reflected by the upper reflection surface 33 of the first reflection surface 31 contributes to formation of the light distribution pattern P4 illustrated in FIG. 9. Since the upper reflection surface 33 is provided to extend in the left/right direction, the bright part of this light distribution pattern P4 extends in the left/right direction. Further, the light distribution pattern P4 has a bright part L in the center above the horizontal plane of the zero degree in the up/down direction. The bright part L is formed by light which has passed from the back to the front below the focus F1 of the projector lens 20 among the light reflected by the upper reflection surface 33. More specifically, the light, which would be reflected by the upper reflection surface 33 and the second reflection surface 70 when the shade 60 is in the light blocking position, is not reflected by the second reflection surface 70 when the shade 60 is in the retracting position, and this light contributes to formation of the bright part L.

The light reflected by the lower reflection surface 35 of the first reflection surface 31 contributes to formation of the light distribution pattern P5 illustrated in FIG. 9. The bright part of the light distribution pattern P5 is formed with the position of the zero degree in the left/right direction being as the center thereof, and is formed above the horizontal plane of the zero degree in the up/down direction. Since the degree of flattening of the upper reflection surface 33 in the up/down direction is larger than the degree of flattening of the lower reflection surface 35 in the up/down direction, the width of the range in the left/right direction of the bright part of the light distribution pattern P5 is narrower than the width of the bright part of the light distribution pattern P4.

According to the above embodiment, the second reflection surface 70 is formed at the rear face of the shade 60. When the shade 60 is standing, the shade 60 is arranged near the front focus (front focuses F32 and F52) of the first reflection surface 31, and therefore reflected light collected by the first reflection surface 31 is incident on the second reflection surface 70. Consequently, even when the area of the second reflection surface 70 is small, the second reflection surface 70 can reflect a large amount of light. Further, the second reflection surface 70 can be narrow, so that it is possible to reduce the size of the vehicle lighting device 1.

Further, the second reflection surface 70 can be arranged between the bulb 10 and the projector lens 20, so that it is possible to prevent the vehicle lighting device 1 from becoming large.

Further, the second reflection surface 70 can be formed in the shade 60, so that an additional reflector is not necessary for the second reflection surface 70. Consequently, it is possible to reduce the number of components of the vehicle lighting device 1 and reduce cost.

Further, the light, which would be blocked by the shade 60 if the second reflection surface 70 is not provided, is reflected downward by the second reflection surface 70. This reflected light is used for a light distribution pattern for going by oncoming vehicles. Consequently, the use efficiency of light flux of the light emitted from the light emitting section 12 improves.

Further, the light reflected by the first reflection surface 31 is reflected by the second reflection surface 70 toward the third reflection surface 41 and the fourth reflection surfaces 42 and 43 below, and therefore even if the distance between the third reflection surface 41 or the fourth reflection surfaces 42 and 43 and the second reflection surface 70 is short, the light reflected by the third reflection surface 41 and the fourth reflection surfaces 42 and 43 is not interfered by, for example, the projector lens 20 or the lens holder thereof. Furthermore, the area illuminated with the light which is reflected by the third reflection surface 41 and the fourth reflection surfaces 42 and 43 can be below the horizontal plane passing through the optical axis Ax1 (see FIG. 8). In addition, the distance between the third reflection surface 41 or the fourth reflection surfaces 42 and 43 and the second reflection surface 70 can be shorter, so that it is possible to reduce the size of the vehicle lighting device 1 in the up/down direction.

Further, the bright part of the light distribution pattern P2 overlaps the bright part of the light distribution pattern P1, so that bright light distribution can be provided and the visibility in the front direction improves. Particularly when the bulb 10 is an HID lamp, the yellow bright part (the bright part of the light distribution pattern P2) overlaps the white bright part (the bright part of the light distribution pattern P1), so that it is possible to prevent occurrence of unevenness in color.

Further, the shade 60 can fall backward and is thereby in the retracting position, and therefore, the second reflection surface 70 is easily hidden. Consequently, when the shade 60 is in the retracting position, the light reflected by the first reflection surface 31 can surely be prevented from being reflected by the second reflection surface 70.

Further, the width of the range in the left/right direction of the bright part of the light distribution pattern P1 formed when the shade 60 is in the light blocking position can be nearly the same as that of the bright part of the light distribution pattern P4 formed when the shade 60 is in the retracting position. In addition, the bright part of the light distribution pattern P1 and the bright part of the light distribution pattern P2 are formed by the light reflected by the upper reflection surface 33. Consequently, the brightness of these bright parts can be nearly the same. Therefore, when paying attention to the area below the horizontal plane passing through the optical axis Ax1, the bright part of the light distribution pattern P1 and bright part of the light distribution pattern P2 overlap when the shade 60 is in the light blocking position, while only the bright part of the light distribution pattern P4 is mainly provided when the shade 60 is in the reflecting position. Therefore, the brightness in the area below the horizontal plane passing through the optical axis Ax1 significantly changes between the case where the shade 60 is in the light blocking position and the case where the shade 60 is in the retracting position. Therefore, the visual difference between a beam for passing by oncoming vehicles and a beam (e.g., high beam) for driving is increased. Consequently, it enables a driver or a rider to easily perceive differences between a beam for driving and a beam for passing by oncoming vehicles.

Further, the bright part of the light distribution pattern P2 which is formed when the shade 60 is in the light blocking position can extend in the left/right direction wider than the light distribution pattern P5 which is formed when the shade 60 is formed at the retracting position. Consequently, a beam for going by oncoming vehicles illuminates a wider range brighter than a beam for driving. Further, the bright part of the light distribution pattern P2 and the bright part of the light distribution pattern P5 are both formed by the lower reflection surface 35. Consequently, the bright part of the light distribution pattern P5 looks brighter than the bright part of the light distribution pattern P2. Hence, a beam for driving provides a higher distant visibility than a beam for passing by oncoming vehicles. As a result, the visual difference between the beam for passing by oncoming vehicles and the beam for driving can be increased.

Further, the front focuses F44 and F45 related to the elliptic arcs of the fourth reflection surfaces 42 and 43 are set in the opening part 94, so that the light reflected by the fourth reflection surfaces 42 and 43 is not blocked by the extension reflector 93. Particularly, the front focuses F44 and F45 related to the elliptic arcs of the fourth reflection surfaces 42 and 43 are set near the rim of the opening part 94, so that the bright part of the light distribution pattern P2 can extend to the maximum in the left/right direction within the range of the opening part 94.

The embodiments to which the presently disclosed subject matter is applicable is by no means limited to the above embodiments and can be adequately changed without deviating from the spirit of the presently disclosed subject matter. Hereinafter, some modifications will be described. The following modifications may be combined as much as possible with any of the above described embodiments and with each other.

First Modification

The driving source for rotating the shade 60 is not limited to the solenoid 81, and may be a motor, piezoelectric element, or other driving sources. For example, a driving shaft of the motor may be directly connected to the rotation shaft 69, or a gear mechanism may be provided between the driving shaft of the motor and the rotation shaft 69.

Second Modification

In the front end of the front inner surface of the complex surface reflector 40, a reflection surface for overhead sign light distribution may be formed.

Third Modification

In the above embodiment, the shade 60 is provided in such a way that the shade 60 can swing in the front/back direction about the rotation shaft 69. On the other hand, the shade 60 may be provided in such a way that the shade 60 can be lifted and lowered by, for example, a linear guide. In this case, when the shade 60 is lifted and the upper rim 64 of the shade 60 is positioned at or near the focus F1 of the projector lens 20, the shade 60 stops. On the other hand, when the shade 60 is lowered and the upper rim 64 of the shade 60 is away from the focus F1 of the projector lens 20 or its vicinity in the downward direction, the shade 60 stops. Also, the design of the driving mechanism 80 can be adequately changed, and the shade 60 can be lifted and lowered by the driving mechanism 80.

According to an aspect of exemplary embodiments of the presently disclosed subject matter, there is provided a vehicle lighting device that can include: a bulb; a projector lens provided in a front direction of the bulb, the projector lens having an optical axis in a front/back direction and having a focus between the projector lens and the bulb; a first reflection surface provided in a back direction of the projector lens, the first reflection surface reflecting light from the bulb toward the projector lens and collecting light, which is reflected by the first reflection surface, at or near the focus of the projector lens; a shade which includes an upper rim, the upper rim being movable between a light blocking position where the upper rim is at or near the focus of the projector lens, and a retracting position where the upper rim is away from the focus of the projector lens in a downward direction; a second reflection surface provided in a back surface of the shade, the second reflection surface reflecting a part of the light, which is reflected by the first reflection surface and is travelling toward the projector lens, in the downward direction, when the shade is in the light blocking position; a third reflection surface provided below the focus of the projector lens, the third reflection surface reflecting light, which is reflected by the second reflection surface, in the front direction to allow light which is reflected by the third reflection surface to be emitted in the front direction in such a way that the light which is reflected by the third reflection surface passes below the projector lens, when the shade is in the light blocking position; and a pair of left and right fourth reflection surfaces provided below the focus of the projector lens, the pair of fourth reflection surfaces reflecting the light, which is reflected by the second reflection surface, in a diagonally forward right direction and a diagonally forward left direction, respectively, to allow light which is reflected by the pair of fourth reflection surfaces to be emitted in the diagonally forward right direction and the diagonally forward left direction in such a way that the light which is reflected by the pair of fourth reflection surfaces passes below the projector lens, when the shade is in the light blocking position.

According to an exemplary embodiment of the presently disclosed subject matter, when the shade is in a light blocking position, the light reflected by a second reflection surface is reflected in the front direction by a third reflection surface and is reflected diagonally forward to the left and right direction by a pair of fourth reflection surfaces. Hence, the area illuminated with the light which is reflected by the third reflection surface and a pair of fourth reflection surfaces spreads in the left/right direction. Consequently, the light reflected by the third reflection surface and a pair of fourth reflection surfaces enhances the light emitted in the front direction through the projector lens, and makes downward light brighter.

On the other hand, if the shade is in a retracting position, the light, which is reflected by the second reflection surface when the shade is in the light blocking position, is not reflected, but is emitted in the front direction through the projector lens. Therefore, this light becomes upward light, and then, the brightness of the downward light is decreased.

Hence, when the position of the shade is switched, brightness of downward light significantly changes, so that the visual difference between a high beam and a low beam is increased.

When the shade is in the light blocking position, an area illuminated with light which is emitted by using the third reflection surface and the pair of fourth reflection surfaces can overlap an area illuminated with the light which is reflected by the first reflection surface toward the projector lens and is emitted through the projector lens in the front direction.

When the shade is in the light blocking position, the area illuminated with the light emitted by using the third reflection surface and the pair of fourth reflection surfaces can be below a horizontal plane passing through the optical axis of the projector lens, and when the shade is in the light blocking position, the area illuminated with the light which is reflected by the first reflection surface toward the projector lens and is emitted through the projector lens in the front direction can be below the horizontal plane passing through the optical axis of the projector lens.

The first reflection surface can include an upper reflection surface which covers an upper part of a light emitting section of the bulb, and a lower reflection surface which covers a lower part of the light emitting section of the bulb, a back focus of the upper reflection surface is at or near the light emitting section of the bulb, a front focus of the upper reflection surface is in the back direction of the projector lens and in the front direction of the focus of the projector lens, a back focus of the lower reflection surface is at or near the light emitting section of the bulb, a front focus of the lower reflection surface is closer to the focus of the projector lens than the front focus of the upper reflection surface, a position of the second reflection surface is between the front focus of the lower reflection surface and the lower reflection surface when the shade is in the light blocking position, when the shade is in the light blocking position, a focus of an optical system including the lower reflection surface and the second reflection surface is in the back direction of the second reflection surface, a shape of each of the pair of fourth reflection surfaces in a horizontal cross-sectional surface is an elliptic arc or a free curve based on the elliptic arc, a first back focus related to the elliptic arc of one of the pair of fourth reflection surfaces is at or near the focus of the optical system, a second back focus related to the elliptic arc of the other of the pair of fourth reflection surfaces is at or near the focus of the optical system, a long axis related to the elliptic arc of one of the pair of fourth reflection surfaces extends to the diagonally forward left direction from the first back focus related to the elliptic arc, and a long axis related to the elliptic arc of the other of the pair of fourth reflection surfaces extends to the diagonally forward right direction from the second back focus related to the elliptic arc.

The vehicle lighting device can further include an extension provided so as to surround upper, lower, left and right sides of the projector lens and which includes, below the projector lens, an opening part through the extension in the front/back direction, wherein the third reflection surface and the pair of fourth reflection surfaces are provided in a back of the opening part, a first front focus related to the elliptic arc of one of the pair of fourth reflection surfaces is near a left rim of the opening part in the opening part, and a second front focus related to the elliptic arc of the other of the pair of fourth reflection surfaces is near a right rim of the opening part in the opening part.

The vehicle lighting device can further include a driving mechanism which drives the shade from the light blocking position to the retracting position and drives the shade from the retracting position to the light blocking position.

The light source can be any known type of light source, and conceivable could be semiconductor type light sources such as LED, laser light devices, OLEDs, etc.

The entire disclosure of Japanese Patent Application No. 2010-159244 filed on Jul. 14, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope and equivalents of the claims that follow.

What is claimed is:

1. A vehicle lighting device comprising:

a bulb;

a projector lens provided in a front direction of the bulb, the projector lens having an optical axis in a front/back direction and having a focus between the projector lens and the bulb;

a first reflection surface provided in a back direction of the projector lens, the first reflection surface configured to reflect light from the bulb toward the projector lens and to collect light, which is reflected by the first reflection surface, substantially at the focus of the projector lens;

a shade which includes an upper rim, the upper rim being movable between a light blocking position where the upper rim is substantially at the focus of the projector lens, and a retracting position where the upper rim is spaced away from the focus of the projector lens in a downward direction;

a second reflection surface provided in a back surface of the shade, the second reflection surface configured to reflect a part of the light, which is reflected by the first reflection surface and is travelling toward the projector lens, in the downward direction, when the shade is in the light blocking position;

a third reflection surface provided below the focus of the projector lens, the third reflection surface configured to reflect light, which is reflected by the second reflection surface, in the front direction to allow light which is reflected by the third reflection surface to be emitted in the front direction in such a way that the light which is reflected by the third reflection surface passes below the projector lens, when the shade is in the light blocking position; and a pair of left and right fourth reflection surfaces provided below the focus of the projector lens, the pair of fourth reflection surfaces configured to reflect the light, which is reflected by the second reflection surface, in a diagonally forward right direction and a diagonally forward left direction, respectively, to allow light which is reflected by the pair of fourth reflection surfaces to be emitted in the diagonally forward right direction and the diagonally forward left direction in such a way that the light which is reflected by the pair of fourth reflection surfaces passes below the projector lens, when the shade is in the light blocking position, wherein when the shade is in the light blocking position, an area illuminated with the light reflected from the third reflection surface and the pair of fourth reflection surfaces is below a horizontal plane passing through the optical axis of the projector lens, so that a first light distribution pattern of a low beam is formed, wherein when the shade is in the light blocking position, an area illuminated with the light which is reflected by the first reflection surface toward the projector lens and is emitted through the projector lens in the front direction is below the horizontal plane passing through the optical axis of the projector lens, so that a second light distribution pattern of a low beam is formed, wherein when the shade is in the light blocking position, at least a portion of the area illuminated with light reflected from the third reflection surface and the pair of fourth reflection surfaces overlaps at least a portion of the area illuminated with light which is reflected by the first reflection surface toward the projector lens and is emitted through the projector lens in the front direction, and wherein the third reflection surface is formed around the fourth reflection surface on the right, left and lower sides thereof.

2. The vehicle lighting device according to claim 1, wherein the first reflection surface includes an upper reflection surface which covers an upper part of a light emitting section of the bulb, and a lower reflection surface which covers a lower part of the light emitting section of the bulb, a back focus of the upper reflection surface is substantially at the light emitting section of the bulb, a front focus of the upper reflection surface is in the back direction of the projector lens and in the front direction of the focus of the projector lens, a back focus of the lower reflection surface is substantially at the light emitting section of the bulb, a front focus of the lower reflection surface is closer to the focus of the projector lens than the front focus of the upper reflection surface, the second reflection surface is located between the front focus of the lower reflection surface and the lower reflection surface when the shade is in the light blocking position, when the shade is in the light blocking position, a focus of an optical system including the lower reflection surface and the second reflection surface is in the back direction of the second reflection surface, a shape of each of the pair of fourth reflection surfaces in a horizontal cross-sectional surface is at least one of an elliptic arc and a free curve based on the elliptic arc, a first back focus related to the elliptic arc of one of the pair of fourth reflection surfaces is substantially at the focus of the optical system, a second back focus related to the elliptic arc of the other of the pair of fourth reflection surfaces is substantially at the focus of the optical system, a long axis related to the elliptic arc of one of the pair of fourth reflection surfaces extends to the diagonally forward left direction from the first back focus related to the elliptic arc, and a long axis related to the elliptic arc of the other of the pair of fourth reflection surfaces extends to the diagonally forward right direction from the second back focus related to the elliptic arc.

3. The vehicle lighting device according to claim 2, further comprising an extension which is configured to surround upper, lower, left and right sides of the projector lens and which includes, below the projector lens, an opening part extending through the extension in the front/back direction, wherein the third reflection surface and the pair of fourth reflection surfaces are provided in a back of the opening part, a first front focus related to the elliptic arc of one of the pair of fourth reflection surfaces is substantially at a left rim of the opening part in the opening part, and a second front focus related to the elliptic arc of the other of the pair of fourth reflection surfaces is substantially at a right rim of the opening part in the opening part.

4. The vehicle lighting device according to claim 1, further comprising a driving mechanism configured to drive the shade from the light blocking position to the retracting position and to drive the shade from the retracting position to the light blocking position.

5. A vehicle lighting device comprising:

a light source;

a projector lens located in a front direction of the light source, the projector lens having an optical axis in a front/back direction and having a focus between the projector lens and the light source;

a first reflection surface located in a back direction of the projector lens, the first reflection surface configured to reflect light from the light source toward the projector lens and to direct light, which is reflected by the first reflection surface, to a location substantially at the focus of the projector lens;

a shade which includes an upper rim, the upper rim being movable between a light blocking position where the upper rim is substantially at the focus of the projector lens, and a retracting position where the upper rim is spaced further away from the focus of the projector lens than when in the blocking position;

a second reflection surface located in a back surface of the shade, the second reflection surface configured to reflect a part of the light, which is reflected by the first reflection surface and is travelling toward the projector lens, in the downward direction, when the shade is in the light blocking position;

a third reflection surface located below the focus of the projector lens, the third reflection surface configured to reflect light, which was reflected by the second reflection surface, in the front direction to allow light which is reflected by the third reflection surface to be emitted in the front direction in such a way that the light which is reflected by the third reflection surface passes below the projector lens, when the shade is in the light blocking position; and a pair of left and right fourth reflection surfaces located below the focus of the projector lens, the pair of fourth reflection surfaces configured to reflect the light, which was reflected by the second reflection surface, in a diagonally forward right direction and a diagonally forward left direction, respectively, to allow light which is reflected by the pair of fourth reflection surfaces to be emitted in the diagonally forward right direction and the diagonally forward left direction in such a way that the light which is reflected by the pair of fourth reflection surfaces passes below the projector lens, when the shade is in the light blocking position, wherein when the shade is in the light blocking position, an area illuminated with the light reflected from the third reflection surface and the pair of fourth reflection surfaces is below a horizontal plane passing through the optical axis of the projector lens, so that a first light distribution pattern of a low beam is formed, wherein when the shade is in the light blocking position, an area illuminated with the light which is reflected by the first reflection surface toward the projector lens and is emitted through the projector lens in the front direction is below the horizontal plane passing through the optical axis of the projector lens, so that a second light distribution pattern of a low beam is formed, wherein when the shade is in the light blocking position, at least a portion of the area illuminated with light reflected from the third reflection surface and the pair of fourth reflection surfaces overlaps at least a portion of the area illuminated with light which is reflected by the first reflection surface toward the projector lens and is emitted through the projector lens in the front direction, and wherein the third reflection surface is formed around the fourth reflection surface on the right, left and lower sides thereof.

6. The vehicle lighting device according to claim 5, wherein the first reflection surface includes an upper reflection surface which covers an upper part of a light emitting section of the light source, and a lower reflection surface which covers a lower part of the light emitting section of the light source, a back focus of the upper reflection surface is substantially at the light emitting section of the light source, a front focus of the upper reflection surface is in the back direction of the projector lens and in the front direction of the focus of the projector lens, a back focus of the lower reflection surface is substantially at the light emitting section of the light source, a front focus of the lower reflection surface is closer to the focus of the projector lens than the front focus of the upper reflection surface, the second reflection surface is located between the front focus of the lower reflection surface and the lower reflection surface when the shade is in the light blocking position, when the shade is in the light blocking position, a focus of an optical system including the lower reflection surface and the second reflection surface is in the back direction of the second reflection surface, a shape of each of the pair of fourth reflection surfaces in a horizontal cross-sectional surface is at least one of an elliptic arc and a free curve based on the elliptic arc, a first back focus related to the elliptic arc of one of the pair of fourth reflection surfaces is substantially at the focus of the optical system, a second back focus related to the elliptic arc of the other of the pair of fourth reflection surfaces is substantially at the focus of the optical system, a long axis related to the elliptic arc of one of the pair of fourth reflection surfaces extends to the diagonally forward left direction from the first back focus related to the elliptic arc, and a long axis related to the elliptic arc of the other of the pair of fourth reflection surfaces extends to the diagonally forward right direction from the second back focus related to the elliptic arc.

7. The vehicle lighting device according to claim 6, further comprising an extension which is configured to surround upper, lower, left and right sides of the projector lens and which includes, below the projector lens, an opening part extending through the extension in the front/back direction, wherein the third reflection surface and the pair of fourth reflection surfaces are located in a back of the opening part, a first front focus related to the elliptic arc of one of the pair of fourth reflection surfaces is substantially at a left rim of the opening part in the opening part, and a second front focus related to the elliptic arc of the other of the pair of fourth reflection surfaces is substantially at a right rim of the opening part in the opening part.

8. The vehicle lighting device according to claim 5, further comprising a driving mechanism configured to drive the shade from the light blocking position to the retracting position and to drive the shade from the retracting position to the light blocking position.

9. The vehicle lighting device according to claim 1, wherein when the shade is in the light blocking position, a bright part of the second light distribution pattern overlaps a bright part of the first light distribution pattern.

10. The vehicle lighting device according to claim 5, wherein when the shade is in the light blocking position, a bright part of the second light distribution pattern overlaps a bright part of the first light distribution pattern.

* * * * *